United States Patent [19]

Epstein et al.

[11] Patent Number: 5,417,883
[45] Date of Patent: May 23, 1995

[54] PROCESS FOR CONTROLLING LAYER SPACING IN MIXTURES OF SMECTIC LIQUID CRYSTAL COMPOUNDS

[75] Inventors: Kenneth A. Epstein, St. Paul; Michael P. Keyes, Minneapolis; Marc D. Radcliffe, Woodbury; Daniel C. Snustad, Mendota Heights, all of Minn.

[73] Assignee: Minnesota Mining and Manufacturing Company, Saint Paul, Minn.

[21] Appl. No.: 225,882

[22] Filed: Apr. 11, 1994

[51] Int. Cl.$^6$ .......................... C09K 17/52; G02F 1/13
[52] U.S. Cl. ............................... 252/299.01; 359/99; 359/100
[58] Field of Search .................. 252/299.01; 359/99, 359/100

[56] References Cited

U.S. PATENT DOCUMENTS

| | | | |
|---|---|---|---|
| 4,367,924 | 1/1983 | Clark et al. | 350/334 |
| 4,886,619 | 12/1989 | Janulis | 252/299.1 |
| 5,062,691 | 11/1991 | Tristani-Kendra et al. | 359/94 |
| 5,082,587 | 1/1992 | Janulis | 252/299.01 |
| 5,206,751 | 4/1993 | Escher et al. | 359/100 |
| 5,262,082 | 11/1993 | Janulis et al. | 252/299.01 |

FOREIGN PATENT DOCUMENTS

0405868A2  1/1991  European Pat. Off. ...... C09K 19/42

OTHER PUBLICATIONS

E. P. Janulis and T. P. Janulis and T. P. Rieker, "New Dimer Smectic A and C Phases in Highly Fluorinated Thermotropic Liquid Crystals", *Phy Rev E* (Preprint).
E. P. Janulis and T. P. Rieker, "Enhanced Thermal Response of the SA$_{d1}$ Layer Thickness in High Fluorinated Thermotropic Liquid Crystals", *Liquid Crystals (Journal)*, (Preprint).
Clark, N. A. et al., Appl. Phys. Lett. 36, 899 (1980).
Demus, D. et al., *Flussige Kristalle in Tabellen*, VEB Deutscher Verlag fur Grundstoffindustrie, pp. 65–76 and 260–263, Leipzig (1974).
Guinier, A. et al, *Small–Angle Scattering of X–Rays*, (translation by C. B. Walker), John Wiley & Sons, pp. 1–4, New York (1955).
Johno, M. et al., Jpn. J. Appl. Phys. 28, L119 (1989).
Kumar, S., Phys. Rev. A 23, 3207 (1981).
Meyer, R. B. et al., J. Physique 36, 1–69 (1975).
Mochizuki et al., Ferroelectrics 122, 37 (1991).
Ouchi, Y. et al., Jpn. J. Appl. Phys. 27, L1993 (1988).
Research Disclosure 34573 (1993).
Ricker, T. P. and N. A. Clark, *Phase Transitions in Liquid Crystals* (edited by S. Martellucci and A. N. Chester), Plenum Press, p. 310, New York (1992).
Rieker, T. P. et al., Phys. Rev. Lett. 59, 2658 (1987).
Rieker, T. P. et al., Ferroelectrics 113, 245 (1991).
Takanishi et al., Jpn. J. Appl. Phys. 29, L984 (1990).
Takanishi et al., Mol. Cryst. Liq. Cryst. 199, 111 (1991).
Yasuda, A. et al., Liquid Crystals 14, 1725 (1993).
Zaschke, H., J. prakt. Chem. 317, 617 (1975).

*Primary Examiner*—Shean Wu
*Attorney, Agent, or Firm*—Gary L. Griswold; Walter N. Kirn; Lucy C. Weiss

[57] ABSTRACT

A process for controlling layer spacing in mixtures of smectic liquid crystal compounds comprises the step of combining a liquid crystal composition having a net negative thermal layer expansion in at least one tilted (or latent tilted) smectic mesophase and a liquid crystal composition having a net positive thermal layer expansion in at least one tilted (or latent tilted) smectic mesophase, each of the compositions comprising at least one smectic or latent smectic liquid crystal compound. The process enables control of layer spacing in the tilted smectic mesophase(s) and thereby control or suppression of chevron layer geometry.

37 Claims, 5 Drawing Sheets

○ 50% COMPOUND 2
● 75% COMPOUND 2
■ COMPOUND 2

■ TE OF MIXTURES

PROCESS FOR CONTROLLING LAYER SPACING IN MIXTURES OF SMECTIC LIQUID CRYSTAL COMPOUNDS

FIELD OF THE INVENTION

This invention relates to a process for preparing mixtures of smectic or latent smectic liquid crystal compounds having a controllable layer expansion or contraction behavior (with respect to temperature) in at least one tilted smectic mesophase. In other aspects, this invention relates to mixtures prepared by the process and to electrooptical display devices containing the mixtures.

BACKGROUND OF THE INVENTION

Devices employing liquid crystals have found use in a variety of electrooptical applications, in particular those which require compact, energy-efficient, voltage-controlled light valves, e.g., watch and calculator displays, as well as the flat-panel displays found in portable computers and compact televisions. Liquid crystal displays have a number of unique characteristics, including low voltage and low power of operation, which make them the most promising of the non-emissive electrooptical display candidates currently available. However, slow response can impose limitations for many potential applications. Speed of response becomes especially important in proportion to the number of elements which have to be addressed in a device, and this limits the potential use of some types of liquid crystals.

The modes of liquid crystal displays that are most extensively employed at the present time are twisted nematic (TN), supertwisted birefringence effect (SBE), and dynamic scattering (DS), all employing nematic or chiral nematic (cholesteric) liquid crystals. These devices are based upon the dielectric alignment effects (Freedericksz effect) of the nematic and/or chiral nematic liquid crystal (or mixtures of nematic or chiral nematic liquid crystals) upon application of an electric field. The average molecular long axis of the liquid crystal material takes up a preferred orientation in the applied electric field, the orientation of which is dependent on the sign of the dielectric anisotropy of the material or mixture, and this orientation relaxes upon removal of the applied electric field. This reorientation and relaxation is slow, on the order of a few milliseconds.

Although nematic and chiral nematic liquid crystals are the most extensively employed, there are liquid crystal devices that employ more highly ordered smectic liquid crystals. These devices are also based on the dielectric reorientation of the liquid crystals, and response times are on the order of milliseconds.

A recent advance in the liquid crystal art has been the utilization of tilted chiral smectic liquid crystals, which are also termed ferroelectric liquid crystals, in devices which give microsecond switching. Ferroelectric liquid crystals were discovered by R. B. Meyer et al. (J. Physique 36, 1–69 (1975)), and fluorine-containing ferroelectric liquid crystal materials have recently been developed (see, e.g., U.S. Pat. No. 4,886,619 (Janulis), U.S. Pat. No. 5,082,587 (Janulis), and U.S. Pat. No. 5,262,082 (Janulis et al.)). Ferroelectric liquid crystals possess a macroscopic electric dipole density which is perpendicular to the molecular tilt direction and parallel to the smectic layer planes. This provides a much stronger coupling of the molecular orientation to an applied electric field than is available via the dielectric anisotropy. Furthermore, the coupling is polar, so that reversal of an applied electric field can be effectively used to control molecular orientation.

A high speed optical switching phenomenon was discovered for ferroelectric liquid crystals by N. A. Clark et al. (see Appl. Phys. Lett. 36, 899 (1980) and U.S. Pat. No. 4,367,924). Clark developed a surface-stabilized ferroelectric liquid crystal display (hereinafter, SSFLCD) which enabled bistable operation not possible in any of the device applications described above. The SSFLCD has been recognized as having high potential in regard to information content, viewing angle, contrast ratio, and switching time, but development of the SSFLCD has been hindered by problems with defects in the liquid crystal layer structure. These defects arise due to layer shrinkage upon cooling (through the temperature ranges associated with the tilted smectic mesophases) and the resulting formation of a "chevron" layer structure (see, e.g., the discussion by T. P. Rieker et al. in Phys. Rev. Lett. 59, 2658 (1987) and Ferroelectrics 113, 245 (1991)), as well as the discussion by Y. Ouchi et al. in Jpn. J. Appl. Phys. 27, L1993 (1988)). Since the defects result in, e.g., a poor contrast ratio and unstable bistability, researchers have earnestly sought means for avoiding the formation of a chevron structure.

European Pat. Publication No. 405,868 (Fujitsu Limited et al.) discloses a liquid crystal composition which exhibits a bookshelf structure. The composition comprises a mixture of ferroelectric (i.e., tilted chiral smectic) liquid crystal compounds, the mixture containing a predetermined amount of a chiral ferroelectric liquid crystal compound having a specific naphthalene ring structure.

Takanishi et al. describe (in Jpn. J. Appl. Phys. 29, L984 (1990) and Mol. Cryst. Liq. Cryst. 199, 111 (1991)) the spontaneous formation of a quasi-bookshelf layer structure in new ferroelectric liquid crystals derived from a naphthalene ring.

Mochizuki et al. obtain both bookshelf and quasi-bookshelf layer structures by using a "naphthalene base liquid crystal mixture with a rubbed polymer orientation films panel" (see Ferroelectrics 122, 37 (1991)).

Research Disclosure 34573 (1993) discloses ferroelectric liquid crystal mixtures having a high percentage of perfluoroether-containing liquid crystal compounds. The mixtures exhibit a spontaneous bookshelf layer structure and have been formulated with negative layer expansion materials to reduce temperature dependence of the layer thickness.

A bookshelf structure obtained by application of an electric field has been reported by M. Johno et al. in Jpn. J. Appl. Phys. 28, L119 (1989) and is also described in U.S. Pat. No. 5,206,751 (Escher et al.).

A bookshelf structure obtained by oblique vapor deposition techniques has been reported by A. Yasuda et al. in Liquid Crystals 14, 1725 (1993).

SUMMARY OF THE INVENTION

It has been discovered that some liquid crystal compounds surprisingly exhibit layer expansion, rather than contraction, upon cooling through the temperature range(s) associated with at least one tilted smectic mesophase. It has also been discovered that such compounds, when used in admixture with certain other liquid crystal compounds, provide mixtures which have a controllable layer expansion or contraction behavior (with respect to temperature). This can be used to effect an essentially temperature-independent layer spacing in the tilted smectic mesophase(s), as well as a reduced temperature dependence of the layer spacing in the temperature range associated with the transition between the non-tilted and the tilted mesophases. Thus, in one aspect, this invention provides a process for controlling layer spacing in mixtures of smectic liquid crystal compounds. The process comprises the step of combining a liquid crystal composition having a net negative thermal layer expansion in at least one tilted (or latent tilted) smectic mesophase and a liquid crystal composition having a net positive thermal layer expansion in at least one tilted (or latent tilted) smectic mesophase, each of the compositions comprising at least one smectic or latent smectic liquid crystal compound. (Latent smectic liquid crystal compounds are those which by themselves may not exhibit certain smectic mesophase(s), e.g., tilted smectic mesophase(s), but which, when in admixture with compounds having smectic mesophases or with other compounds having latent smectic mesophases, develop or exhibit smectic mesophases under appropriate conditions.) Preferably, the composition having a net negative thermal expansion behavior (hereinafter termed "negative composition") is utilized in an amount such that the resulting combination has a net thermal layer expansion within the range of from about $-0.05$ to about $+0.05$ Å/°C.

The process of the invention enables control of layer spacing in the tilted smectic mesophase(s) and thereby control or suppression of chevron layer geometry. Such suppression reduces or eliminates the formation of zig-zag alignment defects upon cooling through the tilted smectic mesophase(s), resulting in improved electooptical switching performance, increased memory to driven cone-tilt angle ratios, and improved contrast ratios. The process also enables the reduction or elimination of the stress-induced defects and non-bookshelf layer geometry which result from heating and cooling cycles.

Furthermore, the process of the invention can be carried out using either chiral or achiral liquid crystal compounds and is not limited to compounds having a particular type of core structure. Since low viscosity materials can be utilized, fast switching speeds can be achieved.

In other aspects, this invention also provides mixtures prepared by the process of the invention and electrooptical display devices containing the mixtures.

DETAILED DESCRIPTION OF THE INVENTION

Figure 1:
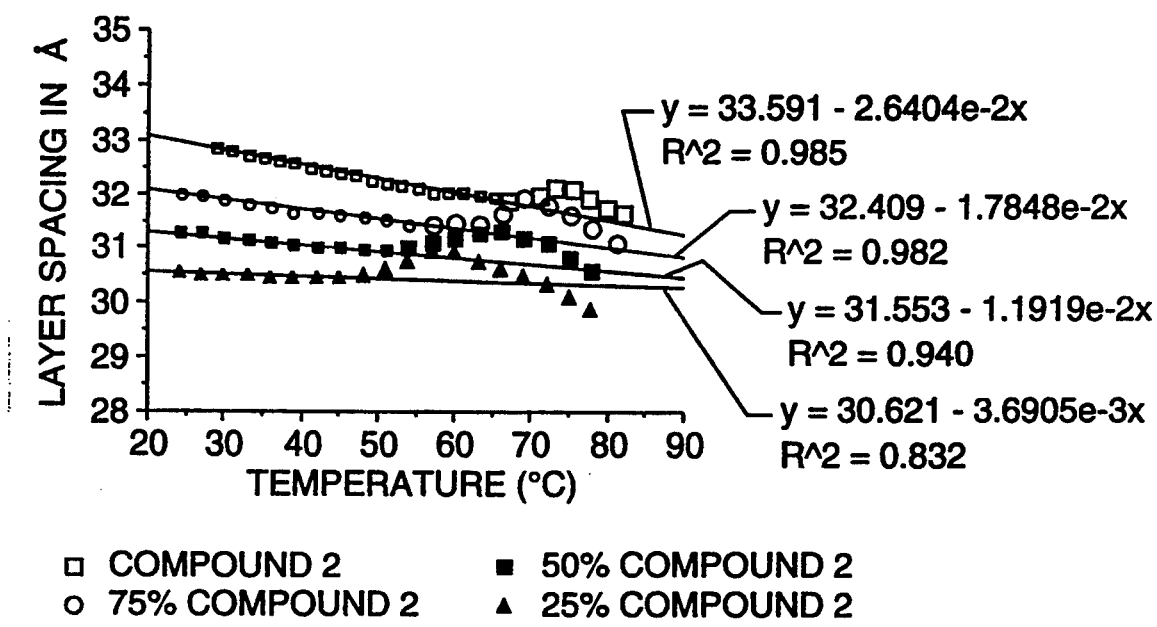
FIGS. 1–5 and 7–9 are plots of layer spacing (obtained by variable-temperature, small-angle X-ray scattering) versus temperature for the liquid crystal samples (compounds or mixtures) described in the examples, infra. The portions of the plots designated by symbols of reduced size are those portions selected for linear fit. The slopes of the equations shown in the figures correspond to the thermal layer expansion values of the samples.

Liquid crystal compositions suitable for use as negative compositions according to the process of the invention are those compositions which have a net negative thermal layer expansion in at least one tilted (or latent tilted) smectic mesophase and which comprise at least one smectic or latent smectic liquid crystal compound. Smectic (or latent smectic) liquid crystal compounds suitable for inclusion in the negative compositions include, e.g., those which exhibit a mechanism which offsets the layer shrinkage associated with the tilting of the molecules in at least one tilted (or latent tilted) smectic mesophase and which thereby exhibit negative thermal expansion behavior in the mesophase(s). Such compounds can be used in admixture with liquid crystal compounds which do not exhibit such a mechanism (and which therefore exhibit positive thermal layer expansion behavior), provided that the resulting composition has a net negative thermal layer expansion.

Preferred smectic or latent smectic liquid crystal compounds which can be utilized in the negative compositions are chiral or achiral liquid crystal compounds which have at least one fluorinated terminal portion and which exhibit negative thermal layer expansion behavior in at least one tilted (or latent tilted) smectic mesophase. A preferred class of such compounds is that class of chiral or achiral liquid crystal compounds which have at least one fluoroether terminal portion containing at least two catenary, i.e., in-chain, ether oxygen atoms and which exhibit negative thermal layer expansion behavior. Such compounds can comprise, e.g., (a) an aliphatic fluorocarbon terminal portion containing at least two catenary ether oxygen atoms; (b) an aliphatic hydrocarbon terminal portion; and (c) a central core connecting the terminal portions. The aliphatic hydrocarbon terminal portion of the compounds can be either chiral or achiral. (Such achiral compounds are described in U.S. Pat. No. 5,262,082 (Janulis et al.), the description of which is incorporated herein by reference.) The aliphatic fluorocarbon terminal portion can be represented by the formula $-D(C_xF_{2x}O)_zC_yF_{2y+1}$, where x is independently an integer of 1 to about 12 for each $C_xF_{2x}O$ group, y is an integer of 1 to about 12, z is an integer of 2 to about 10, and D is selected from the group consisting of a covalent bond,

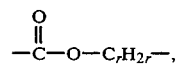

$-O-C_rH_{2r}-$, $-O+(C_sH_{2s}O)_tC_rH_{2r'}-$, $-C_rH_{2r}-$, $+C_sH_{2s}O)_tC_rH_{2r'}-$, $-OSO_2-$, $-SO_2-$, $-SO_2-C_rH_{2r}-$,

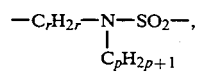

$-C\equiv C-$, $-CH=CH-$,

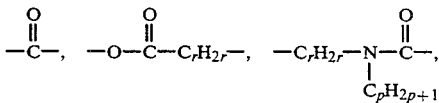

$-CH=N-$, $-O-$, $-S-$, $-N(C_pH_{2p+1})-$, and combinations thereof, where r and r' are independently integers of 0 to about 20, s is independently an integer of 1 to about 10 for each $(C_sH_{2s}O)$, t is an integer of 1 to about 6, and p is an integer of 0 to about 4. The $(C_xF_{2x}O)_zC_yF_{2y+1}$ group of the fluorocarbon terminal portion can contain small amounts of residual carbon-bonded hydrogen atoms but is preferably completely fluorinated. Preferably, the fluorocarbon terminal portion is a linear group represented by the formula —D($C_xF_{2x}O)_zC_yF_{2y+1}$, where D is —OCH$_2$—, x is independently an integer of 1 to about 8 for each $C_xF_{2x}O$ group, y is an integer of 1 to about 8, and z is an integer of 2 to about 6.

Such liquid crystal compounds can be represented by the general formula I:

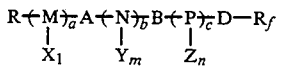
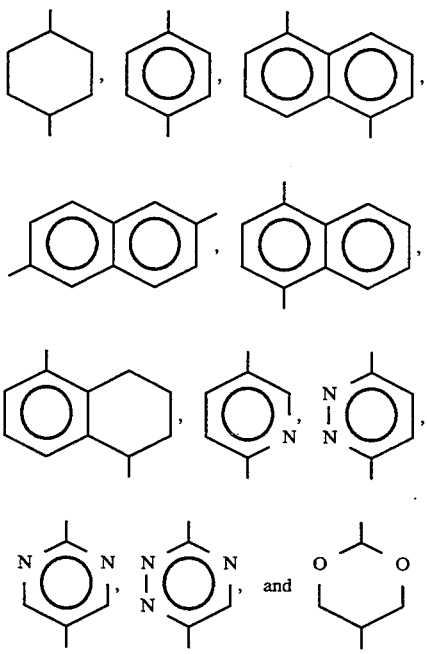

a, b, and c are each independently zero or an integer of from 1 to 3, with the proviso that the sum of a+b+c be at least 1;

each A and B are non-directionally and independently selected from the group consisting of a covalent bond,

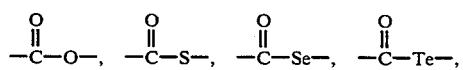

—(CH$_2$CH$_2)_k$— where k is 1 to 4,
—CH=CH—, —C≡C—, —CH=N—, —CH$_2$—O—,

and —O—;

each X, Y, and Z are independently selected from the group consisting of —H, —Cl, —F, —Br, —I, —OH, —OCH$_3$, —CH$_3$, —CF$_3$, —OCF$_3$ —CN, and —NO$_2$;

each l, m, and n are independently zero or an integer of 1 to 4;

D is selected from the group consisting of a covalent bond,

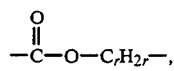

—O—C$_r$H$_{2r}$—,

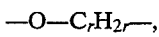

—C≡C—, —CH=CH—,

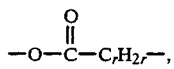

—O—(C$_s$H$_{2s}$O)$_t$—C$_r$H$_{2r'}$—, —C$_r$H$_{2r'}$—, —(C$_s$H$_{2s}$O)$_t$—C$_r$H$_{2r'}$—, —O—, —S—, —OSO$_2$—, —SO$_2$—, —SO$_2$—C$_r$H$_{2r}$—,

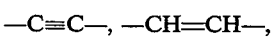

—N(C$_p$H$_{2p+1}$)—,

—CH=N—, and combinations thereof, where r and r' are independently integers of 0 to about 20, s is independently an integer of 1 to about 10 for each (C$_s$H$_{2s}$O), t is an integer of 1 to about 6, and p is an integer of 0 to about 4;

R is selected from the group consisting of —O—((C$_{q'}$H$_{2q'-v'}$—(R')$_{v'}$)—O)$_w$—C$_q$H$_{2q+1-v}$—(R')$_v$, —((C$_{q'}$H$_{2q'-v'}$—(R')$_{v'}$)—O)$_w$—C$_q$H$_{2q+1-v}$—(R')$_v$,

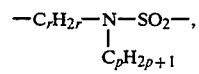

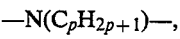

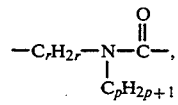

and —CR'H—(D)$_{g'}$—CR'H—, where each R' is independently selected from the group consisting of —Cl, —F, —CF$_3$, —NO$_2$, —CN, —H, —C$_q$H$_{2q+1}$,

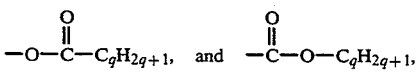

where q' is independently an integer of 1 to about 20 for each (C$_{q'}$H$_{2q'}$—O), q is an integer of 1 to about 20, w is an integer of 0 to about 10, v is an integer of 0 to about 6, each v' is independently an integer of 0 to about 6, g is an integer of 1 to about 3, g' is an integer of 1 to about 3, each D is independently selected from the group set forth above, and R can be linear or branched and chiral or achiral; and $R_f$ is $-(C_xF_{2x}O)_zC_yF_{2y+1}$, where x is independently an integer of 1 to about 12 for each $(C_xF_{2x}O)$, y is an integer of 1 to about 12, and z is an integer of 2 to about 10. Preferably, D is $-OCH_2-$, $R_f$ is linear, x is independently an integer of 1 to about 8 for each $(C_xF_{2x}O)$, y is an integer of 1 to about 8, and z is an integer of 2 to about 6.

A preferred subclass of the compounds can be represented by the following formula:

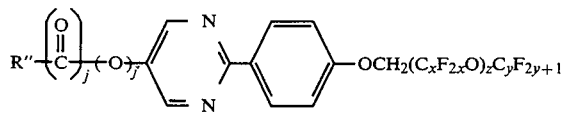

where x is independently an integer of 1 to about 8 for each $C_xF_{2x}O$; y is an integer of 1 to about 8; z is an integer of 2 to about 4; j is an integer of 0 or 1; j' is an integer of 0 or 1; and R" is selected from the group consisting of $(R')_v-C_qH_{2q+1-v}$ and

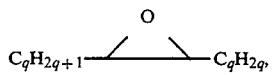

where each q is independently an integer of 2 to about 10; each R' is independently selected from the group consisting of hydrogen, fluorine, chlorine, methyl, and perfluoromethyl; v is an integer of 0 to about 4; and $C_qH_{2q}$ and $C_qH_{2q+1}$ can be linear or branched.

Another preferred class of liquid crystal compounds which have at least one fluorinated terminal portion and which can be utilized in the negative compositions are those smectic or latent smectic, chiral or achiral liquid crystal compounds which have at least one fluoroaliphatic terminal portion (e.g., the compounds described in U.S. Pat. No. 4,886,619 (Janulis) and U.S. Pat. No. 5,082,587 (Janulis), the descriptions of which are incorporated herein by reference) and which exhibit negative thermal layer expansion behavior in at least one tilted (or latent tilted) smectic mesophase. For example, 5-hexyl-2-(4'-1,1-dihydroperfluorooctyloxy)phenylpyrimidine has been found to exhibit such behavior and to be suitable for such use.

Other liquid crystal compounds which possess a mechanism which offsets the layer shrinkage associated with the tilting of the molecules in at least one tilted (or latent tilted) smectic mesophase and which thereby exhibit negative thermal expansion behavior in the mesophase(s) can also be utilized in the negative compositions.

Liquid crystal compositions suitable for use in admixture with the above-described negative compositions according to the process of the invention are those compositions which have a net positive thermal layer expansion in at least one tilted (or latent tilted) smectic mesophase and which comprise at least one smectic or latent smectic liquid crystal compound. Smectic (or latent smectic) liquid crystal compounds suitable for inclusion in the liquid crystal compositions having net positive thermal expansion behavior (hereinafter termed "positive compositions") include chiral and achiral liquid crystal compounds which have aliphatic terminal portions and which exhibit positive thermal layer expansion behavior in at least one tilted (or latent tilted) smectic mesophase, e.g., compounds such as the alkyl, alkoxy phenylpyrimidines and the alkoxy, alkoxy phenylbenzoates described by D. Demus et al. in *Flussige Kristalle in Tabellen*, VEB Deutscher Verlag fur Grundstoffindustrie, pages 65–76 and 260-63, Leipzig (1974) and by S. Kumar in Phys. Rev. A 23, 3207 (1984); chiral and achiral liquid crystal compounds which have at least one fluoroaliphatic terminal portion (such compounds are described, e.g., in U.S. Pat. No. 4,886,619 (Janulis) and U.S. Pat. No. 5,082,587 (Janulis), the descriptions of which are incorporated herein by reference) and which exhibit positive thermal layer expansion behavior in at least one tilted (or latent tilted) smectic mesophase, e.g., compounds such as Compound B in Table 1, infra; and chiral and achiral liquid crystal compounds which have at least one fluoroether terminal portion containing only one catenary ether oxygen atom and which exhibit positive thermal layer expansion behavior in at least one tilted (or latent tilted) smectic mesophase. The latter compounds can be, e.g., compounds which comprise (a) an aliphatic fluorocarbon terminal portion containing one catenary ether oxygen atom; (b) an aliphatic hydrocarbon terminal portion; and (c) a central core connecting the terminal portions. The aliphatic fluorocarbon terminal portion can be represented by the formula $-D(C_xF_{2x}O)_zC_yF_{2y+1}$, where x is an integer of 1 to about 12 (preferably, 1 to about 8), y is an integer of 1 to about 12 (preferably, 1 to about 8), z is an integer of 1, and D is selected from the group defined above. Such compounds can be represented by the general formula I above, wherein R, M, N, P, A, B, D, X, Y, Z, a, b, c, l, m, and n are as defined above, and wherein $R_f$ is $-(C_xF_{2x}O)_zC_yF_{2y+1}$, where x is an integer of 1 to about 12, y is an integer of 1 to about 12, and z is an integer of 1. Preferably, D is $-OCH_2-$, $R_f$ is linear, x is an integer of 1 to about 8, and y is an integer of 1 to about 8.

When compound(s) having a fluoroether terminal portion containing at least two catenary ether oxygen atoms are used as the major component(s) of the negative compositions, the compositions can preferably be combined with positive compositions comprising (as the major component(s)) at least one chiral or achiral liquid crystal compound having a fluoroaliphatic terminal portion or, more preferably, a fluoroether terminal portion containing only one catenary ether oxygen atom. Such combinations are preferred from the standpoint of compatibility.

The process of the invention can be carried out by combining a negative composition and a positive composition. The combining or mixing of the compositions can be effected by introducing the compositions to a vessel, generally with simultaneous and/or subsequent agitation or stirring, e.g., roller mixing. The vessel can be either an open or a closed vessel of a size which is sufficient to hold both compositions while allowing room for mixing. The compositions can be formed prior to combination with each other, or, alternatively, one or more of the components of either can be combined with one or more of the components of the other prior to addition of the remaining components. Any order and manner of combination of the components of the compositions is acceptable. The resulting combination is preferably agitated or stirred sufficiently that a homogeneous mixture is achieved. This is preferably facilitated by applying sufficient heat to melt the combination or by dissolving the combination in a solvent, e.g., a polar aprotic solvent, with subsequent solvent removal, e.g., by rotary evaporation.

The compositions (and components thereof) to be utilized can be selected based upon the signs and values of their thermal layer expansion in at least one tilted (or latent tilted) smectic mesophase, e.g., the smectic C mesophase. Both the sign and the absolute value of such expansion can be determined using variable temperature small angle X-ray scattering (SAXS). The SAXS technique is described in, e.g., *Small-Angle Scattering of X-Rays* by A. Guinier et al. (translation by C. B. Walker), John Wiley & Sons, pages 1–4, New York (1955), and its application to liquid crystals is described, e.g., by S. Kumar in Phys. Rev. A 23, 3207 (1981). The sign and the absolute value of the expansion can be determined by calculating the sign and the magnitude of the slope of a line fitted to an approximately linear region (selected by inspection) of a plot of layer spacing versus temperature for the desired mesophase(s). Generally, the temperature region selected for fitting can be that which corresponds to the useful temperature range for a particular device application, and data associated with the transition between the tilted and non-tilted mesophases can generally be excluded from the selected region due to nonlinearity. A component or composition for which the layer spacing increases (decreases) with increasing temperature has a positive (negative) thermal layer expansion.

Preferably, the negative composition is utilized in an amount such that the resulting combination has a net thermal layer expansion within the range of from about $-0.05$ to about $+0.05$ Å/°C., more preferably, from about $-0.01$ to about $+0.01$ Å/°C., most preferably, from about $-0.005$ to about $+0.005$ Å/°C. However, in some cases an expansion value outside of these ranges may be desirable for a particular purpose and can be achieved by the mixing of positive and negative compositions. Net expansions within these ranges can generally be achieved by choosing an amount of the negative composition such that that amount multiplied by the absolute value of the composition's net negative expansion is essentially equal to the amount of the positive composition multiplied by the absolute value of its net positive expansion. (This corresponds to the fitting of a linear equation to a plot of expansion versus weight percent or mole fraction.) Refinement of the value of the net expansion (to obtain a value which is closer to that desired) can be achieved through an iterative process (in which the measured net expansion value of the mixture is used to refine the equation describing the relationship between the expansion values and weight percent or mole fraction).

When latent smectic liquid crystal compounds are utilized, their thermal layer expansion values (which are unmeasurable due to the latency of the smectic mesophase) can be approximated by preparing mixtures (according to the process of the invention) having a range of different compositions, measuring the expansion values of the mixtures, plotting expansion versus weight percent or mole fraction, fitting a linear equation to the data, and solving the equation for a composition corresponding to 100% latent smectic compound.

The process of the invention provides combinations or mixtures which have a controllable layer expansion or contraction behavior (with respect to temperature) which can be used to effect an essentially temperature-independent layer spacing in at least one tilted smectic mesophase (as well as a reduced temperature dependence of the layer spacing in the temperature range associated with the transition between the non-tilted and the tilted mesophases). The process enables control of layer shrinkage and thus suppression of chevron layer geometry. This reduces or eliminates the formation of zig-zag alignment defects upon cooling through the tilted smectic mesophase(s), resulting in improved electooptical switching performance, increased memory to driven cone-tilt angle ratios, and improved contrast ratios. The process also enables the reduction or elimination of the stress-induced defects and non-bookshelf layer geometry which result from heating and cooling cycles.

Mixtures having an essentially temperature-independent layer spacing in at least one tilted smectic mesophase can also be prepared by combining smectic or latent smectic liquid crystal compounds (or compositions) having only small negative (or only small positive) thermal layer expansions in the mesophase(s), the expansions preferably having values in the range of from about $-0.05$ Å/°C. to about $+0.025$ Å/°C., more preferably, from about $-0.01$ Å/°C. to about $+0.01$ Å/°C., most preferably, from about $-0.005$ Å/°C. to about $+0.005$ Å/°C.

Mixtures having a particular desired non-zero temperature dependence of the layer spacing in at least one tilted smectic mesophase can be prepared by combining smectic or latent smectic liquid crystal compound(s) or composition(s) having a selected negative (positive) thermal layer expansion in the mesophase(s) with other such compound(s) or composition(s) having a selected negative (positive) expansion. The negative (positive) expansions can be selected to bracket a desired intermediate expansion value (and the amounts of the compounds or compositions then based on an approximately linear relationship between the expansions and the amounts, as described supra) or can be selected to approximate such a value. Alternatively, a particular desired non-zero temperature dependence can be achieved by combining compound(s) or composition(s) having a selected negative (positive) expansion with compound(s) or composition(s) having an expansion of approximately zero. Such non-zero temperature dependence of the layer spacing may be desired, e.g., to counterbalance the density-driven formation of chevrons described by T. P. Ricker and N. A. Clark in *Phase Transitions in Liquid Crystals* (edited by S. Martellucci and A. N. Chester), Plenum Press, page 310, New York (1992).

Objects and advantages of this invention are further illustrated by the following examples, but the particular materials and amounts thereof recited in these examples, as well as other conditions and details, should not be construed to unduly limit this invention. The fluorine-containing liquid crystal compounds utilized in the examples can be prepared by application of the methods described in U.S. Pat. No. 4,886,619 (Janulis), U.S. Pat. No. 5,082,587 (Janulis), and U.S. Pat. No. 5,262,082 (Janulis et al.), the descriptions of which are incorporated herein by reference.

EXAMPLES

In the following examples, layer spacing was measured by the SAXS technique in which small angle X-ray scattering is observed as a function of temperature. Data was collected using a Kratky camera, copper K-alpha radiation, and a linear position sensitive detector. A liquid crystal sample (either a single compound or a mixture) was placed in an open-ended quartz capillary tube and positioned on the surface of a stainless steel specimen holder with the tube axis in the horizontal plane and perpendicular to the beam path. The sample was heated to the isotropic state and then cooled for the initial determination of the layer spacing, with a ten minute waiting period prior to data collection. The sample was then cooled in two to three degree increments, and data was acquired at each temperature following a ten minute waiting period.

Layer spacing data was plotted with respect to temperature, and the region of the desired mesophase (smectic C) which was approximately linear was selected by inspection. Generally the data region between the tilted and non-tilted mesophases was excluded from the selected data due to nonlinearity. The layer spacing data for the selected region was plotted, and a linear equation was fitted to the data. The slope of the linear equation represented the thermal layer expansion value of the sample in the selected temperature range. Thus, a sample with layer spacing that increased with increasing temperature had a positive thermal expansion. Using this technique, thermal expansions (TEs) were determined for a variety of liquid crystal compounds suitable for use in the process of the invention. The results are shown in Table 1.

TABLE 1

| Compound Number | Structure | Smectic C TE ($Å/°C. \times 10^{-2}$) |
|---|---|---|
| 1 | $C_{10}H_{21}O$—⟨phenyl⟩—C(O)O—⟨phenyl⟩—C(O)O—$OCH_2CF_2OC_2F_4OC_4F_9$ | −3.17 |
| 2 | $C_{10}H_{21}O$—⟨pyrimidine⟩—⟨phenyl⟩—$OCH_2CF_2OCF_2CF_2OC_4F_9$ | −2.64 |
| 9 | $C_8H_{17}$—⟨pyrimidine⟩—⟨phenyl⟩—$OCH_2CF_2OC_2F_4OC_4F_9$ | −1.92 |
| 10 | $C_{10}H_{21}$—⟨pyrimidine⟩—⟨phenyl⟩—$OCH_2CF_2O(CF_2CF_2O)_2C_6F_{13}$ | −4.01 |
| 11 | $C_{10}H_{21}O$—⟨pyrimidine⟩—⟨phenyl⟩—$OCH_2CF_2OCF_2CF_2OC_6F_{13}$ | −3.10 |
| 12 | $C_8H_{17}$—⟨pyrimidine⟩—⟨phenyl⟩—$OCH_2(CF_2)_3O(CF_2)_4OC_4F_9$ | −0.48 |
| A | $C_8H_{17}$—⟨pyrimidine⟩—⟨phenyl⟩—$OCH_2C_2F_4OC_4F_9$ | +0.36* |
| B | $C_{10}H_{21}$—⟨pyrimidine⟩—⟨phenyl⟩—$OCH_2C_5F_{11}$ | +3.31* |
| C | $C_8H_{17}$—⟨pyrimidine⟩—⟨phenyl⟩—$OCH_2CH_2OCH_2CF_2OC_2F_4OC_4F_9$ | −0.44* |

TABLE 1-continued

| Compound Number | Structure | Smectic C TE ($Å/°C. \times 10^{-2}$) |
|---|---|---|
| D | $C_{10}H_{21}$—[pyrimidine]—[phenyl]—$OCH_2C_5H_{11}$ | +1.13** |

*Extrapolated Value
**Estimated Value

EXAMPLE 1

Control of Layer Spacing by Mixing Negative and Positive Compositions

The layer spacing of a sample of 5-decyloxy-2-(4'-(1,1-dihydroperfluoro-2-(2-butoxyethoxy)ethoxy)-phenylpyrimidine (Compound 2 of Table 1) was measured as a function of temperature, plotted, and its thermal expansion calculated by the method described above. The resulting plot of layer spacing (in Angstroms) versus collection temperature is shown in FIG. 1. The calculated expansion was $-2.64 \times 10^{-2}$ Å/°C. in the smectic C mesophase. The fit of the line used was y=33,591 - 2.6404e-2x, R2=0.985.

A series of mixtures of Compound 2 and 5-octyl-2-(4'-(1,1-dihydroperfluoro-(3-butoxypropoxy)phenyl-pyrimidine (Compound A of Table 1) were then prepared, and the thermal expansions of the mixtures were determined essentially as previously described. The resulting plots of layer spacing (in Angstroms) versus collection temperature (in degrees centigrade) are shown in FIG. 1. The calculated thermal expansions of the mixtures were as follows:

| 100% Compound 2 | $-2.64 \times 10^{-2}$ Å/°C. |
|---|---|
| 75% Compound 2/25% Compound A | $-1.78 \times 10^{-2}$ Å/°C. |
| 50% Compound 2/50% Compound A | $-1.19 \times 10^{-2}$ Å/°C. |
| 25% Compound 2/75% Compound A | $-0.37 \times 10^{-2}$ Å/°C. |

By plotting the calculated values of the TE for each mixture versus the weight percent of Compound 2, it was possible to extrapolate to a theoretical composition of 100 weight percent Compound A (0 weight percent Compound 2) for which a value of the TE for pure Compound A was calculated to be $+0.36 \times 10^{-2}$ Å/°C.

The above data shows that Compound 2 (having a negative thermal expansion) can be mixed with liquid crystal materials having a positive thermal expansion (indicating contraction upon cooling within the tilted mesophase) to offset the layer contraction of the positive materials and thereby enable control of layer expansion behavior to achieve an essentially temperature-independent layer spacing in the smectic C mesophase (a TE approximately equal to zero).

The above-listed thermal expansions (TEs) of the mixtures approximately fit the equation $100 \times TE = 0.3590 - 2.26 \times$ (weight ratio of Compound 2 to Compound A).

If a TE value even closer to zero (than the $-0.37 \times 10^{-2}$ Å/°C. value obtained for the mixture of 25% Compound 2 and 75% Compound A) is desired, refinement of the equation can be achieved by an iterative process.

EXAMPLE 2

Control of Layer Spacing by Mixing Negative and Positive Compositions

Figure 2:
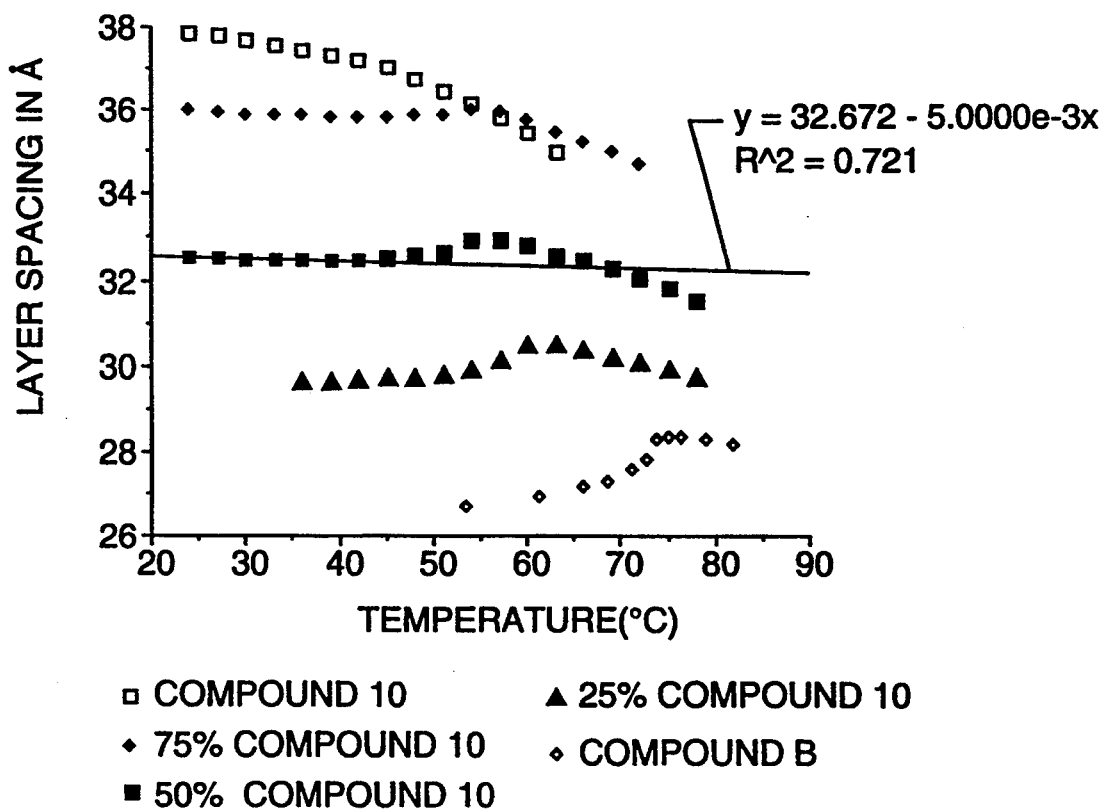

The TE of Compound 10 of Table 1 was determined using essentially the procedure of Example 1. The TEs of mixtures of Compound 10 (exhibiting strong layer expansion upon cooling) and 5-decyl-2-(4'-(1,1-dihydroperfluorohexyloxy)phenylpyrimidine (Compound B, exhibiting strong layer contraction upon cooling) were determined using a modification of the above-described SAXS technique in which the capillary tube was replaced by a thin homeotropic film of the liquid crystal mixture on a substrate (a glass microscope cover slip) treated with a silane adhesion promoter (commercially available from DuPont as VM651). The resulting sample was placed in a horizontal X-ray beam in Kratky geometry with the sample layer normal in the vertical orientation, with adjustments to maximize scattering. The resulting plots of layer spacing (in Angstroms) versus collection temperature are shown in FIG. 2.

The thermal expansions of the mixtures were determined to be as follows:

| 100% Compound 10 | $-4.01 \times 10^{-2}$ Å/°C. |
|---|---|
| 75% Compound 10/25% Compound B | $-6.39 \times 10^{-3}$ Å/°C. |
| 50% Compound 10/50% Compound B | $-5.00 \times 10^{-3}$ Å/°C. |

This data shows that Compound 10 (having a large negative thermal expansion) can be mixed with liquid crystal materials having a positive thermal expansion and exhibiting strong layer contraction to greatly counterbalance that contraction.

EXAMPLE 3

Figure 3:
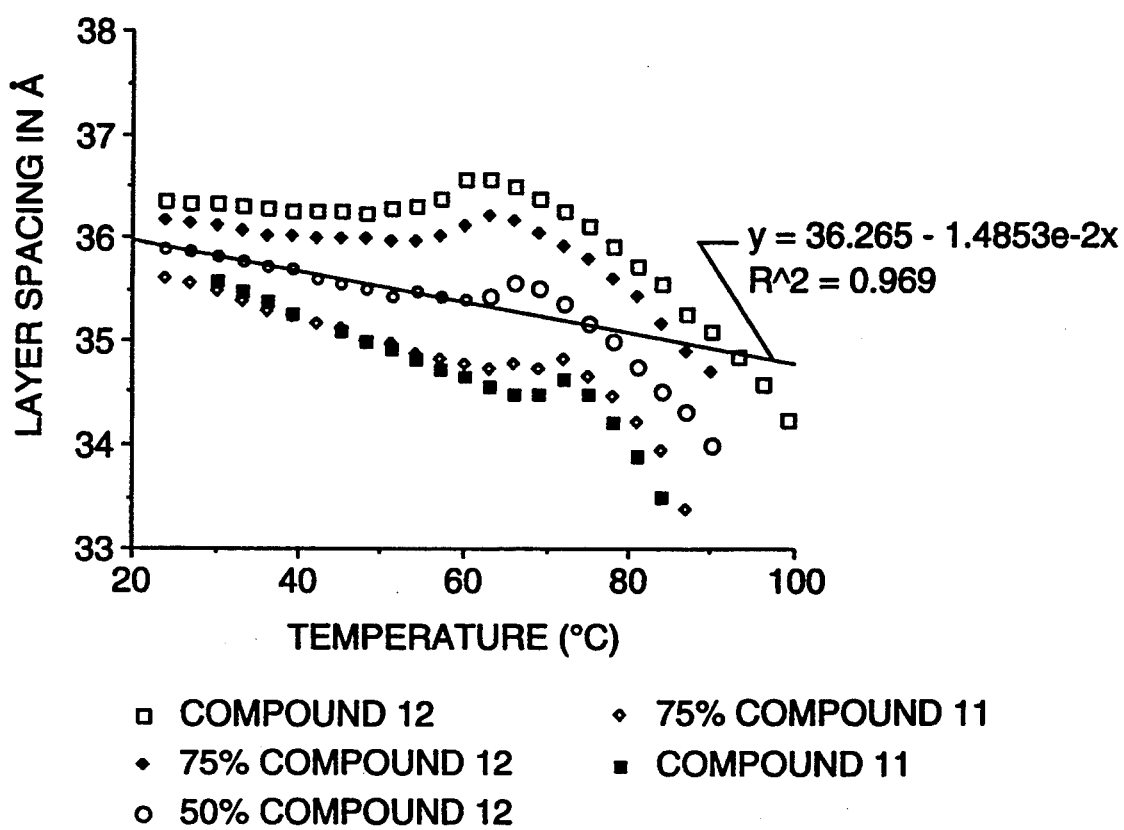

Control of Layer Spacing by Mixing Compositions Having Thermal Expansions of the Same (Negative) Sign The TEs of Compounds 11 and 12 of Table 1 were determined essentially as described in Example 1, and the values are shown in Table 1. Both compounds were found to have a negative TE. Mixtures of the two compounds were prepared, and the TEs of the mixtures were determined by essentially the same procedure. The resulting plots of layer spacing (in Angstroms) versus collection temperature are shown in FIG. 3.

The thermal expansions of the mixtures were determined to be as follows:

| Compound 11:Compound 12 (weight %) | TE ($Å/°C. \times 10^{-2}$) |
|---|---|
| 75:25 | −2.32 |
| 50:50 | −1.49 |
| 25:75 | −0.62 |

This data shows that Compounds 11 and 12 (both having negative thermal expansions) can be mixed to enable control of layer expansion behavior to achieve desired intermediate thermal expansion values which may be useful to compensate for the bulk thermal expansion of the composition or for the positive layer expansion of a second composition.

EXAMPLE 4

Control of Layer Spacing by Mixing Negative and Positive Compositions

Figure 4:
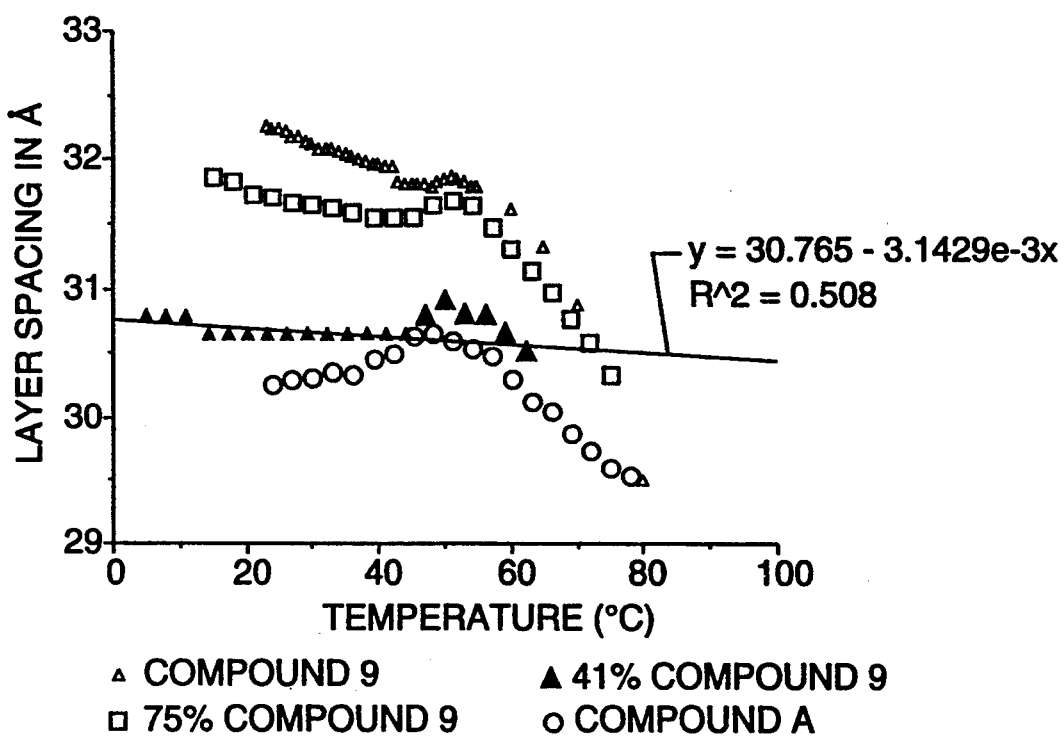

The TEs of 5-octyl-2-(4'-(1,1-dihydroperfluoro-2-(2-butoxyethoxy)ethoxy)phenylpyrimidine (Compound 9 of Table 1) and 5-octyl-2-(4'-(1,1-dihydroperfluoro-(3-butoxypropoxy)phenylpyrimidine (Compound A of Table 1) were determined essentially as described in Example 1 and found to be negative for Compound 9 and positive for Compound A. A mixture of 75 weight percent Compound 9 and 25 weight percent Compound A was prepared, and the TE of the mixture was determined by essentially the same procedure. The resulting plots of layer spacing (in Angstroms) versus collection temperature are shown in FIG. 4.

From the plots of the data for pure Compound 9 and the mixture, it was predicted (by iterative fitting of a line to TE versus composition data, as described in Example 1) that a mixture of 41 weight percent Compound 9 and 59 weight percent Compound A should have a TE of about zero. This mixture was prepared, and its TE was determined essentially as described above and was found to be $-0.31 \times 10^{-2}$ Å/°C. This data shows that Compound 9 (having a negative thermal expansion) can be mixed with liquid crystal materials having a positive thermal expansion to enable control of layer expansion behavior to predictably achieve an essentially temperature-independent layer spacing in at least one tilted smectic mesophase. (If a TE value even closer to zero were desired, an iterative process could be utilized as described in Example 1.)

EXAMPLE 5

Figure 5:
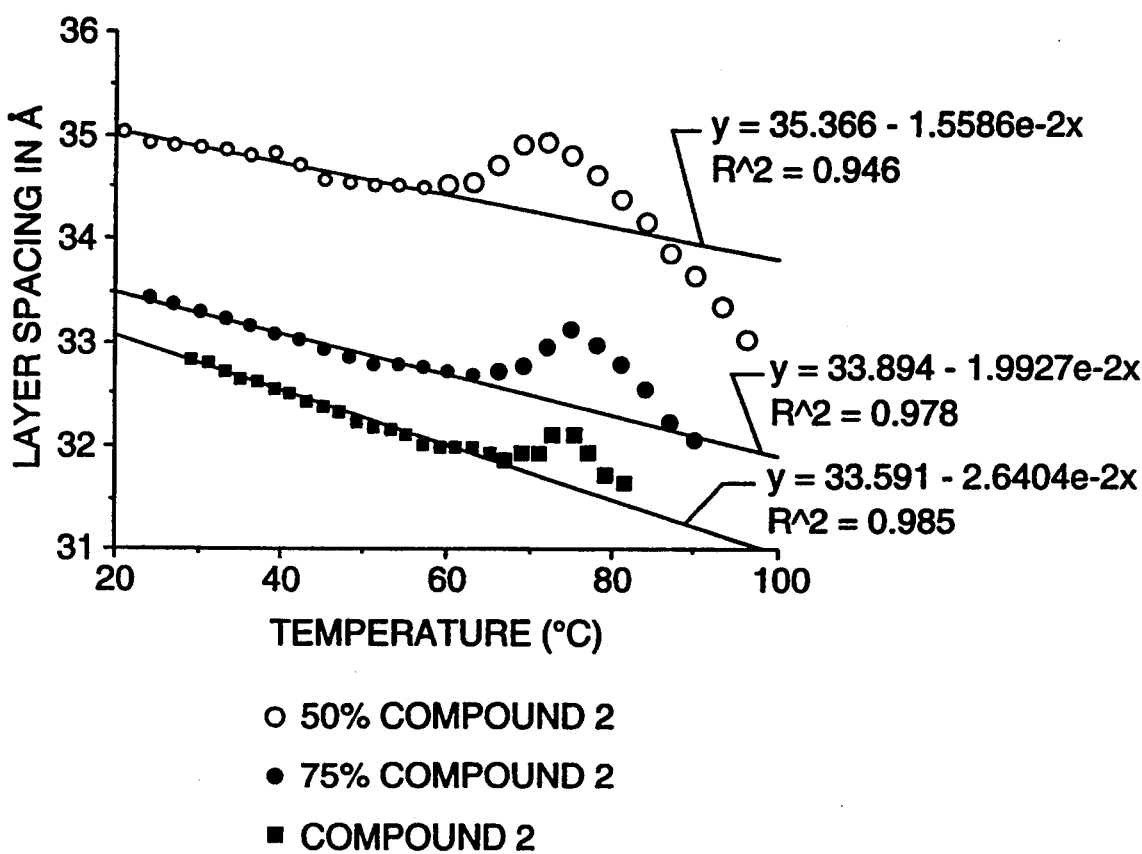

Determination of the Thermal Expansion (in a Tilted Smectic Mesophase) of a Latent Tilted Smectic Liquid Crystal Compound In this example, a smectic liquid crystal compound having a negative TE (Compound 2 of Table 1) was mixed in various proportions with a latent tilted smectic liquid crystal compound (Compound C of Table 1). The TEs of the various mixtures were determined essentially as in Example 1 in order to enable approximation of the TE of Compound C (which could not be directly determined due to the latency of the smectic C mesophase) in this particular mixture. The resulting plots of layer spacing versus temperature are shown in FIG. 5.

Figure 6:
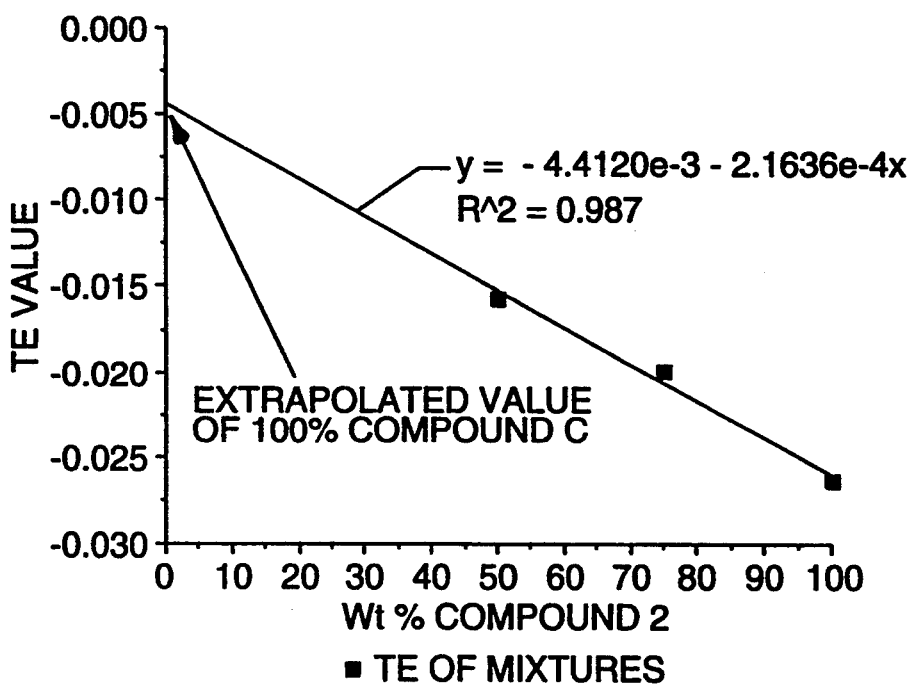
FIG. 6 is a plot of thermal layer expansion value versus composition for the liquid crystal compound mixtures described in Example 5, infra.

By plotting the values of the TE for each mixture versus the weight percent of Compound 2, it was possible to extrapolate to a theoretical composition of 100 weight percent Compound C (0 weight percent Compound 2) for which a value of the TE for pure Compound C was calculated to be $-0.44 \times 10^{-2}$ Å/°C., as shown in FIG. 6.

EXAMPLE 6

Control of Layer Spacing by Mixing Negative and Positive Compositions

Figure 7:
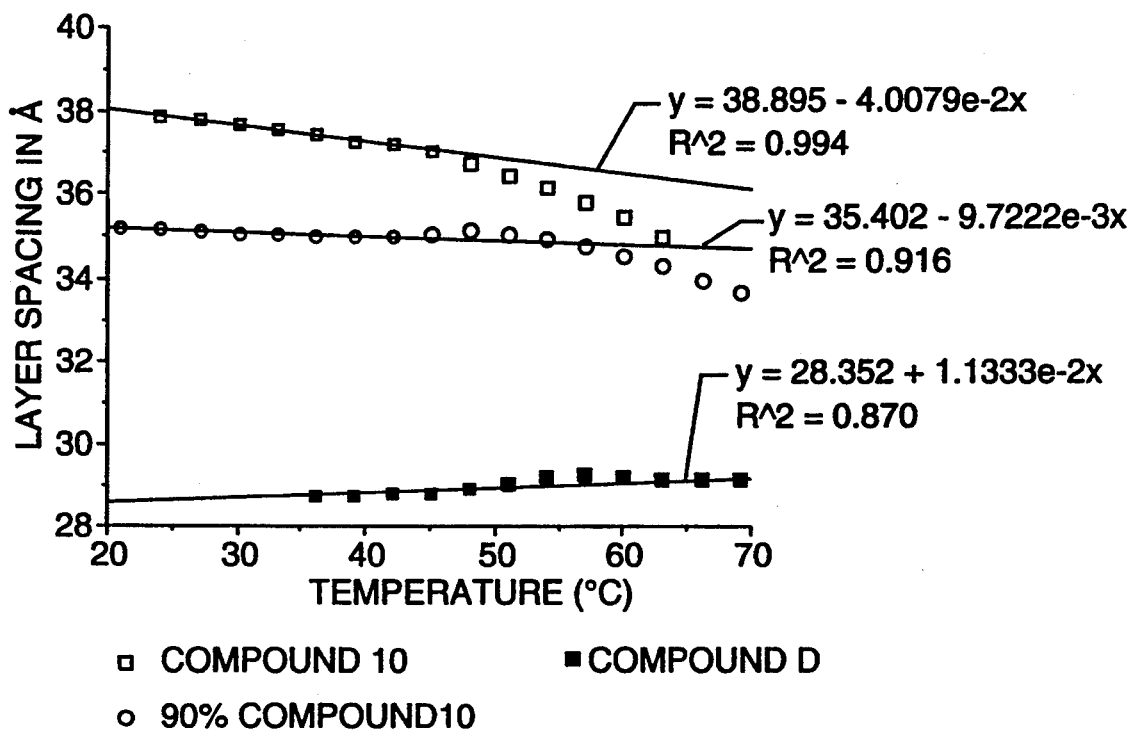

In this example, a smectic liquid crystal compound having a negative TE (Compound 10 of Table 1) was mixed with a non-fluorinated smectic liquid crystal compound having a positive TE (5-decyl-2-hexyloxyphenylpyrimidine, Compound D of Table 1, which can be prepared by the methods described by H. Zaschke in J. prakt. Chem. 317, 617 (1975)). The TEs of the pure compounds and of a mixture of 90 weight percent Compound 10 and 10 weight percent Compound D were determined essentially as in Example 1, and the resulting plots are shown in FIG. 7 below. The TE of the mixture was intermediate in value to the TEs of the two pure compounds, demonstrating that negative and positive compositions can be combined according to the process of the invention to enable control of layer expansion behavior.

EXAMPLE 7

Figure 8:
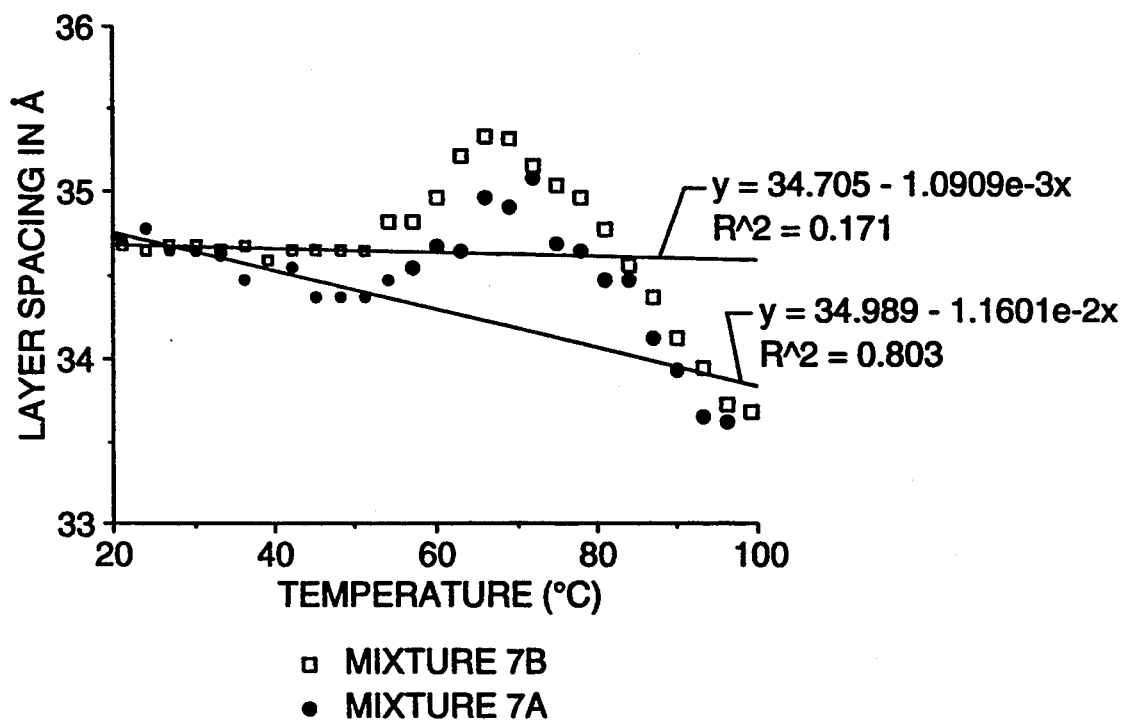

Liquid Crystal Display Device Containing a Ferroelectric Liquid Crystal Mixture Prepared by the Process of the Invention Two mixtures of ferroelectric liquid crystal compounds (Mixtures 7A and 7B, having the compositions shown in Table 2 below) were prepared according to the process of the invention. The TE for the smectic C mesophase of each mixture was determined essentially as in Example 1, and the resulting plots of layer spacing versus temperature are shown in FIG. 8. The figure shows that latent smectic C liquid crystal compounds (the two compounds unique to Mixture 7B) can be used as additives to further reduce the TE value of a mixture and achieve even greater temperature independence in the ferroelectric phase.

TABLE 2

| Compound | Mixture 7A (wt %) | Mixture 7B (wt %) |
| --- | --- | --- |
| $C_8H_{17}$—[pyrimidine]—[phenyl]—$OCH_2CF_2OC_2F_4OC_4F_9$ | 0.41 | 0.43 |
| $C_8H_{17}$—[pyrimidine]—[phenyl]—$OCH_2(CF_2)_3O(CF_2)_4OC_4F_9$ | 1.23 | 1.2 |
| $C_8H_{17}O$—[pyrimidine]—[phenyl]—$OCH_2CF_2OCF_2CF_2OC_6F_{13}$ | 1.23 | 1.2 |

TABLE 2-continued

| Compound | Mixture 7A (wt %) | Mixture 7B (wt %) |
|---|---|---|
| $C_{10}H_{21}$—[pyrimidine]—[phenyl]—$OCH_2CF_2OC_2F_4OC_4F_9$ | 0.41 | 0.43 |
| $C_{10}H_{21}$—[pyrimidine]—[phenyl]—$OCH_2(CF_2)_3O(CF_2)_4OC_4F_9$ | 4.91 | 4.62 |
| $C_{10}H_{21}$—[pyrimidine]—[phenyl]—$OCH_2CF_2OCF_2CF_2OC_6F_{13}$ | 0.41 | 0.43 |
| $C_8H_{17}$—[pyrimidine]—[phenyl]—$OCH_2CF_2O(C_2F_4O)_2CF_3$ | 0.41 | 0.43 |
| $C_{10}H_{21}O$—[pyrimidine]—[phenyl]—$OCH_2CF_2OCF_2CF_2OC_4F_9$ | 4.5 | 4.28 |
| $C_{10}H_{21}O$—[pyrimidine]—[phenyl]—$OCH_2(CF_2)_3O(CF_2)_4OC_4F_9$ | 8.9 | 8.55 |
| $C_{10}H_{21}O$—[pyrimidine]—[phenyl]—$OCH_2CF_2OCF_2CF_2OC_6F_{13}$ | 13.5 | 12.8 |
| $C_{10}H_{21}O$—[phenyl]—C(O)O—[phenyl]—C(O)O—$OCH_2CF_2OC_2F_4OC_4F_9$ | 4.4 | 4.28 |
| $C_{12}H_{25}O$—[pyrimidine]—[phenyl]—$OCH_2CF_2OCF_2CF_2OC_4F_9$ | 4.5 | 4.28 |
| $C_8H_{17}O$—[pyrimidine]—[phenyl]—$OCH_2(CF_2)_3O(CF_2)_4OC_4F_9$ | 9.20 | 8.55 |
| $C_8H_{17}O$—[pyrimidine]—[phenyl]—$OCH_2CF_2OCF_2CF_2OC_6F_{13}$ | 4.5 | 4.28 |
| $C_8H_{17}$—[pyrimidine]—[phenyl]—[phenyl]—$OCH_2CF_2OC_2F_5$ | 4.5 | 4.28 |

TABLE 2-continued

| Compound | Mixture 7A (wt %) | Mixture 7B (wt %) |
|---|---|---|
| 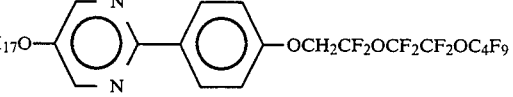 $C_8H_{17}O\text{—[pyrimidine]—[phenyl]—}OCH_2CF_2OCF_2CF_2OC_4F_9$ | 13.5 | 12.8 |
|  $C_9H_{19}O\text{—[pyrimidine]—[phenyl]—}OCH_2CF_2OCF_2CF_2OC_4F_9$ | 13.5 | 12.8 |
|  $C_8H_{17}\text{—[pyrimidine]—[phenyl]—}OCH_2CH_2OCH_2CF_2OC_2F_4OC_4F_9$ | — | 3.38 |
| 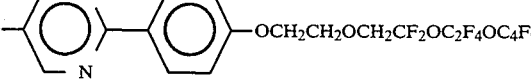 $C_8H_{17}\text{—[pyrimidine]—[phenyl]—}OCH_2CH_2OCH_2C_7F_{15}$ | — | 1.13 |
|  $C_8H_{17}\text{—[pyrimidine]—[phenyl]—}O\text{-CO-CH(Cl)-CH(CH_3)_2}$ | 6.6 | 6.8 |
|  $C_{10}H_{21}\text{—[pyridine]—[phenyl]—}O\text{-CO-CH(Cl)-CH_3}$ | 3.3 | 3.3 |
| TE (Å/°C.) | −0.012 | −0.0011 |

A working surface-stabilized ferroelectric liquid crystal device (SSFLCD) was constructed in the following manner:

Onto an indium tin oxide (ITO) coated (300 Å ITO coating), ultrasonically cleaned glass substrate (2.85×3.5×0.1 cm) was placed several drops of a 0.52 weight percent solution of nylon 6/6 (Aldrich Chemical Co.) in formic acid. The substrate was spun at 1200 rpm for 40 seconds and cured at 75° C. for 16 hours to provide a nylon coating about 400 Å thick. The coated substrate was rubbed (20 strokes) in one direction with a 115 gram rubbing bar (a glass rod 2.5 cm in diameter, 10 cm long) about which a 65% cotton, 35% rayon velveteen fabric was tightly wrapped, to provide an oriented alignment layer on the substrate.

Onto another ITO coated (300 Å ITO thickness) glass substrate (2.85×3.5×0.1 cm) having a pattern of polyimide spacer posts 1.5 μm in height (and which had been ultrasonically cleaned) was placed several drops of a 1.5 weight percent solution of polydimethylsiloxane (5.6% GR-651L, available from Owen-Illinois, Inc.) in butyl alcohol. The substrate was spun at 8000 rpm for 20 seconds and cured at 75° C. for 16 hours to provide an alignment coating about 200–300 Å thick.

Two sets of the above-described substrates were assembled using a UV curable adhesive (Norland TM 61 Optical Adhesive, available from Norland Products, Inc.) with the ITC-constituted electrodes and the alignment layers facing inward to form two cells. Each cell was then filled with one of the two mixtures of liquid crystal compounds (Mixtures 7A and 7B, shown in Table 2) by heating using capillary action under vacuum to form switchable devices.

The ITO constituted electrodes of the device were connected to an arbitrary waveform generator with variable output voltage. The device was placed on the rotation stage of a polarized light microscope. The incandescent light source of the microscope was filtered to confine its wavelength to between 450 and 700 nm. The optical transmission was measured with a photomultiplier tube and displayed on an oscilloscope. The latching time for the device, measured with a field of 20 V/μm and at a temperature of 24° C. was 80 μs. The device was driven with a voltage waveform consisting of bipolar, square pulses of 20 V/μm spaced at least 30 ms apart by a train of square pulses having the same width and 6.7 V/μm amplitude. The memory to tilt angle ratio of the device was measured to be 0.87.

Comparative Example

Figure 9:
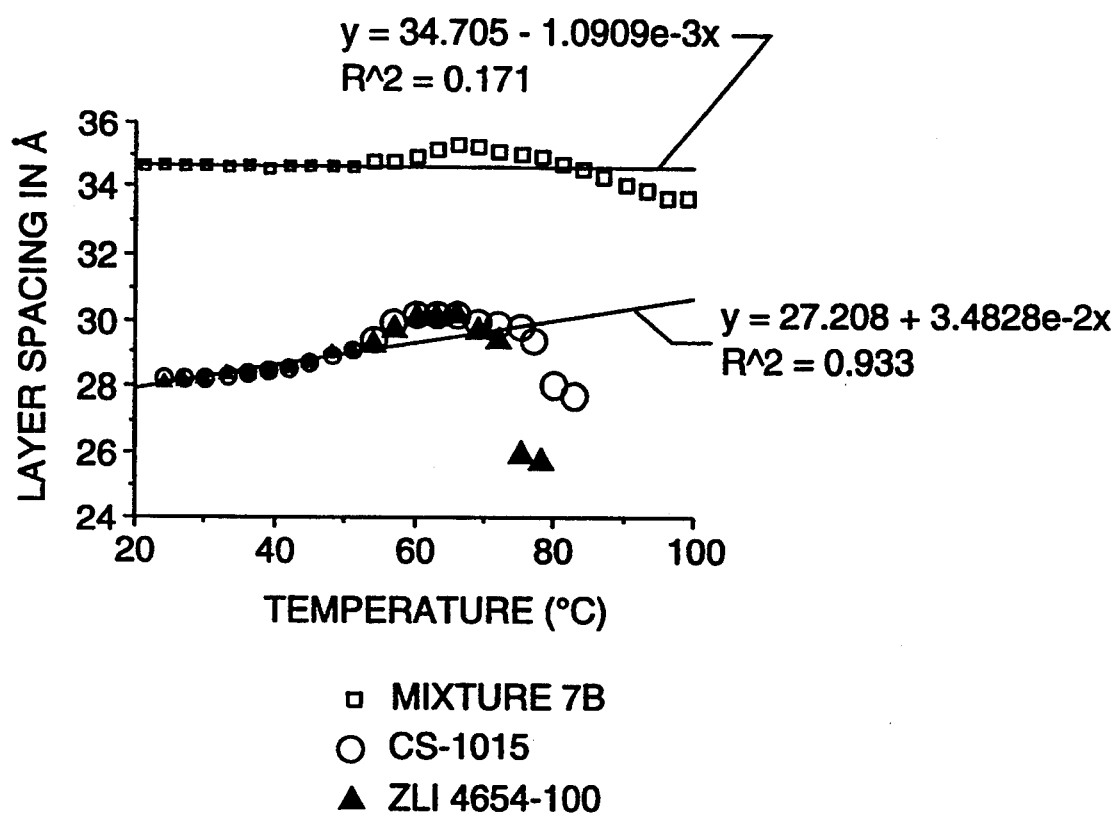

Two commercially available ferroelectric liquid crystal mixtures (CS-1015, available from Chisso Corp., Japan, and ZLI 4654-100, available from Merck, Germany) were selected as being representative of commercially available ferroelectric liquid crystal mixtures sold for use in SSFLCDs. The TEs of the mixtures were determined essentially as in Example 1, and the resulting plots of layer spacing versus temperature are shown in FIG. 9. Also shown in FIG. 9 is a plot of layer spacing versus temperature for Mixture 7B of Example 7, prepared according to the process of the invention. The plots of the data for the two commercially available mixtures are nearly superimposable, giving nearly identical positive TE values. In contrast with the two commercial mixtures, Mixture 7B exhibits the essentially temperature-independent layer spacing which has been highly sought in the art.

Various modifications and alterations of this invention will become apparent to those skilled in the art without departing from the scope and spirit of this invention.

We claim:

1. A process for controlling layer spacing comprising the step of combining a liquid crystal composition having a net negative thermal layer expansion in at least one tilted or latent tilted smectic mesophase and a liquid crystal composition having a net positive thermal layer expansion in at least one tilted or latent tilted smectic mesophase, each of said compositions comprising at least one liquid crystal compound selected from the group consisting of smectic liquid crystal compounds and latent smectic liquid crystal compounds, so as to form a mixture of liquid crystal compounds having a controllable layer expansion or contraction behavior.

2. The process of claim 1 wherein said composition having a net negative thermal layer expansion is utilized in an amount such that the resulting combination has an essentially temperature-independent layer spacing in at least one tilted smectic mesophase.

3. A process for controlling layer spacing comprising the step of combining a liquid crystal composition having a net negative thermal layer expansion in at least one tilted or latent tilted smectic mesophase and a liquid crystal composition having a net positive thermal layer expansion in at least one tilted or latent tilted smectic mesophase, each of said compositions comprising at least one liquid crystal compound selected from the group consisting of smectic liquid crystal compounds and latent smectic liquid crystal compounds, wherein said composition having a net negative thermal layer expansion is utilized in an amount such that the resulting combination has a net thermal layer expansion in at least one tilted smectic mesophase within the range of from about $-0.05$ to about $+0.05$ Å/°C.

4. The process of claim 3 wherein said range is from about $-0.01$ to about $+0.01$ Å/°C.

5. The process of claim 4 wherein said range is from about $-0.005$ to about $+0.005$ Å/°C.

6. The process of claim 1 wherein said composition having a net negative thermal layer expansion comprises at least one chiral or achiral liquid crystal compound having at least one fluorinated terminal portion.

7. The process of claim 6 wherein said compound has at least one fluoroether terminal portion containing at least two catenary ether oxygen atoms.

8. The process of claim 7 wherein said compound comprises (a) an aliphatic fluorocarbon terminal portion containing at least two catenary ether oxygen atoms; (b) an aliphatic hydrocarbon terminal portion; and (c) a central core connecting said terminal portions.

9. The process of claim 8 wherein said aliphatic fluorocarbon terminal portion is represented by the formula $-D(C_xF_{2x}O)_zC_yF_{2y+1}$, where x is independently an integer of 1 to about 12 for each $C_xF_{2x}O$ group, y is an integer of 1 to about 12, z is an integer of 2 to about 10, and D is selected from the group consisting of a covalent bond,

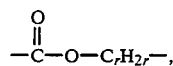

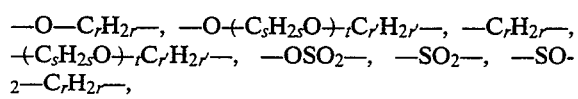

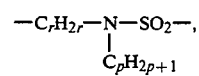

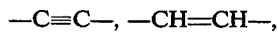

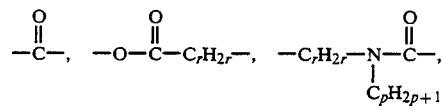

$-CH=N-$, $-O-$, $-S-$, $-N(C_pH_{2p+1})-$, and combinations thereof, where r and r' are independently integers of 0 to about 20, s is independently an integer of 1 to about 10 for each ($C_sH_{2s}O$), t is an integer of 1 to about 6, and p is an integer of 0 to about 4.

10. The process of claim 8 wherein said compound is represented by the general formula I:

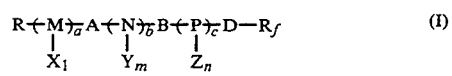

where M, N, and P are each independently selected from the group consisting of

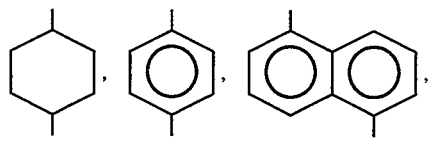

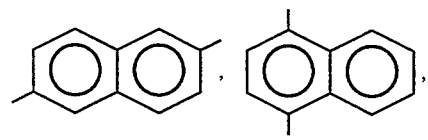

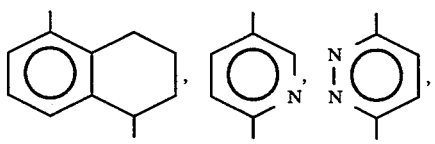

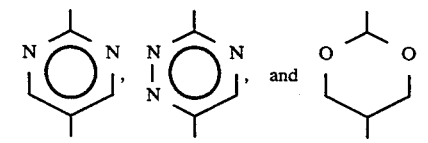

a, b, and c are each independently zero or an integer of from 1 to 3, with the proviso that the sum of $a+b+c$ be at least 1;

each A and B are non-directionally and independently selected from the group consisting of a covalent bond,

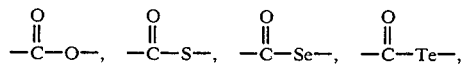

—(CH$_2$CH$_2$)$_k$— where k is 1 to 4,
—CH=CH—, —C≡C—, —CH=N—, —CH$_2$—O—,

and —O—;
each X, Y, and Z are independently selected from the group consisting of —H, —Cl, —F, —Br, —I, —OH, —OCH$_3$, —CH$_3$, —CF$_3$, —OCF$_3$ —CN, and —NO$_2$;
each l, m, and n are independently zero or an integer of 1 to 4;
D is selected from the group consisting of a covalent bond,

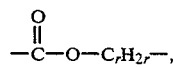

—O—C$_r$H$_{2r}$—,

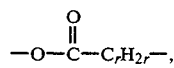

—C≡C—, —CH=CH—,

—O—(C$_s$H$_{2s}$O)—C$_r$H$_{2r'}$—, —C$_r$H$_{2r}$—, —(C$_s$H$_{2s}$O)—C$_r$H$_{2r'}$—, —O—, —S—, —OSO$_2$—, —SO$_2$—, —SO$_2$—C$_r$H$_{2r}$—,

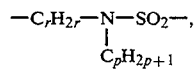

—N(C$_p$H$_{2p+1}$)—,

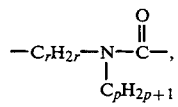

—CH=N—, and combinations thereof, where r and r' are independently integers of 0 to about 20, s is independently an integer of 1 to about 10 for each (C$_s$H$_{2s}$O), t is an integer of 1 to about 6, and p is an integer of 0 to about 4;
R is selected from the group consisting of
—O—((C$_{q'}$H$_{2q'-v'}$—(R')$_{v'}$)—O)$_w$—C$_q$H$_{2q+1-v}$—(R')$_v$,
—((C$_{q'}$H$_{2q'v'}$—(R')$_{v'}$)—O)$_w$—C$_q$H$_{2q+1-v}$—(R')$_v$,

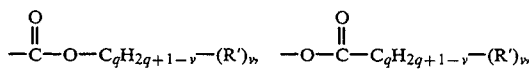

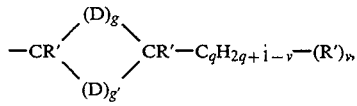

and —CR'H—(D)$_{g'}$—CR'H—, where each R' is independently selected from the group consisting of —Cl, —F, —CF$_3$, —NO$_2$, —CN, —H, —C$_q$H$_{2q+1}$,

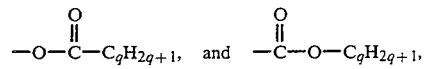

where q' is independently an integer of 1 to about 20 for each (C$_{q'}$H$_{2q'}$—O—), q is an integer of 1 to about 20, w is an integer of 0 to about 10, v is an integer of 0 to about 6, each v' is independently an integer of 0 to about 6, g is an integer of 1 to about 3, g' is an integer of 1 to about 3, each D is independently selected from the group set forth above, and R is linear or branched and chiral or achiral; and
R$_f$ is —(C$_x$F$_{2x}$O)$_z$C$_y$F$_{2y+1}$, where x is independently an integer of 1 to about 12 for each (C$_x$F$_{2x}$O), y is an integer of 1 to about 12, and z is an integer of 2 to about 10.

11. The process of claim 10 wherein said compound is represented by the formula:

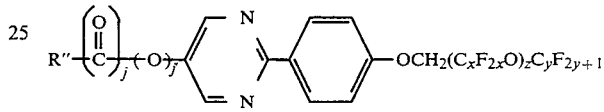

where x is independently an integer of 1 to about 8 for each C$_x$F$_{2x}$O; y is an integer of 1 to about 8; z is an integer of 2 to about 4; j is an integer of 0 or 1; j' is an integer of 0 or 1; and R" is selected from the group consisting of (R')$_v$—C$_q$H$_{2q+1-v}$ and $$C_qH_{2q+1}\overset{O}{\triangle}C_qH_{2q'}$$

where each q is independently an integer of 2 to about 10; each R' is independently selected from the group consisting of hydrogen, fluorine, chlorine, methyl, and perfluoromethyl; v is an integer of 0 to about 4; and C$_q$H$_{2q}$ and C$_q$H$_{2q+1}$ are linear or branched.

12. The process of claim 6 wherein said compound has at least one fluoroaliphatic terminal portion.

13. The process of claim 12 wherein said compound is 5-hexyl-2-(4'-1,1-dihydroperfluorooctyloxy)phenyl-pyrimidine.

14. The process of claim 1 wherein said composition having a net positive thermal layer expansion comprises at least one chiral or achiral liquid crystal compound having terminal portions independently selected from the group consisting of aliphatic terminal portions, fluoroaliphatic terminal portions, and fluoroether terminal portions containing one catenary ether oxygen atom.

15. The process of claim 8 wherein said compound is the major component of said composition having a net negative thermal layer expansion, and wherein said composition having a net positive thermal layer expansion comprises as the major component at least one chiral or achiral liquid crystal compound having a terminal portion selected from the group consisting of fluoroaliphatic terminal portions and fluoroether terminal portions containing one catenary ether oxygen atom.

16. The process of claim 15 wherein said terminal portion is a fluoroether terminal portion containing one catenary ether oxygen atom.

17. A process for controlling layer spacing comprising the step of combining a liquid crystal composition having a net negative thermal layer expansion of known magnitude in at least one tilted or latent tilted smectic mesophase and a liquid crystal composition having a net positive thermal layer expansion of known magnitude in at least one tilted or latent tilted smectic mesophase, said compositions comprising at least one liquid crystal compound selected from the group consisting of smectic liquid crystal compounds and latent smectic liquid crystal compounds, and said compositions being utilized in amounts based upon said magnitudes such that the resulting combination has a desired net thermal layer expansion in at least one tilted smectic mesophase.

18. A mixture of liquid crystal compounds prepared by the process of claim 1.

19. A mixture of liquid crystal compounds comprising a liquid crystal composition having a net negative thermal layer expansion in at least one tilted or latent tilted smectic mesophase and a liquid crystal composition having a net positive thermal layer expansion in at least one tilted or latent tilted smectic mesophase, each of said compositions comprising at least one liquid crystal compound selected from the group consisting of smectic liquid crystal compounds and latent smectic liquid crystal compounds, wherein said composition having a net negative thermal layer expansion is present in an amount such that said mixture has a net thermal layer expansion in at least one tilted smectic mesophase within the range of from about −0.05 to about +0.05 Å/°C.

20. The mixture of claim 19 wherein said range is from about −0.01 to about +0.01 Å/°C.

21. The mixture of claim 20 wherein said range is from about −0.005 to about +0.005 Å/°C.

22. A liquid crystal display device containing the mixture of claim 18.

23. A liquid crystal display device containing the mixture of claim 19.

24. A process for controlling layer spacing comprising the step of combining a liquid crystal composition having a net negative thermal layer expansion in the smectic C mesophase, said composition comprising at least one chiral or achiral, smectic or latent smectic liquid crystal compound having a fluoroether terminal portion containing at least two catenary ether oxygen atoms; and a liquid crystal composition having a net positive thermal layer expansion in the smectic C mesophase, said composition comprising at least one chiral or achiral, smectic or latent smectic liquid crystal compound having a terminal portion selected from the group consisting of fluoroaliphatic terminal portions and fluoroether terminal portions containing one catenary ether oxygen atom; wherein said composition having a net negative thermal layer expansion is utilized in an amount such that the resulting combination has a net thermal layer expansion in the smectic C mesophase within the range of from about −0.05 to about +0.05 Å/°C.

25. The process of claim 1 wherein said smectic mesophase is the smectic C mesophase.

26. A process for controlling layer spacing comprising the step of combining at least two liquid crystal compositions having net thermal layer expansions of the same sign and known magnitudes in at least one tilted or latent tilted smectic mesophase, said compositions comprising at least one liquid crystal compound selected from the group consisting of smectic liquid crystal compounds and latent smectic liquid crystal compounds, and said compositions being utilized in amounts based upon said magnitudes such that the resulting mixture of liquid crystal compounds has a desired net thermal layer expansion in at least one tilted smectic mesophase.

27. The process of claim 26 wherein said desired net thermal layer expansion is within the range of from about −0.05 to about +0.05 Å/°C.

28. The process of claim 26 wherein said smectic mesophase is the smectic C mesophase.

29. A mixture of liquid crystal compounds prepared by the process of claim 26.

30. A mixture of liquid crystal compounds comprising at least two liquid crystal compositions having net thermal layer expansions of the same sign in at least one tilted or latent tilted smectic mesophase, each of said compositions comprising at least one liquid crystal compound selected from the group consisting of smectic liquid crystal compounds and latent smectic liquid crystal compounds, wherein each of said compositions is present in an amount such that said mixture has a net thermal layer expansion in at least one tilted smectic mesophase within the range of from about −0.05 to about +0.025 Å/°C.

31. A liquid crystal display device containing the mixture of claim 29.

32. A liquid crystal display device containing the mixture of claim 30.

33. A process for estimating the net thermal layer expansion of a latent smectic liquid crystal composition in at least one latent tilted smectic mesophase comprising the steps of (a) preparing at least one mixture of a latent smectic liquid crystal composition and a smectic liquid crystal composition, said latent smectic liquid crystal composition comprising at least one latent smectic liquid crystal compound and said smectic liquid crystal composition comprising at least one smectic liquid crystal compound; (b) determining the net thermal layer expansion of said mixture in at least one selected tilted smectic mesophase; (c) determining the net thermal layer expansion of said smectic liquid crystal composition in at least one corresponding tilted smectic mesophase; and (d) extrapolating to a composition of 100 percent said latent smectic liquid crystal composition to obtain an approximate value of the net thermal layer expansion for said latent smectic liquid crystal composition in at least one corresponding latent tilted smectic mesophase.

34. The process of claim 33 wherein said smectic mesophase is the smectic C mesophase.

35. A liquid crystal display device containing a mixture of liquid crystal compounds comprising a liquid crystal composition having a net negative thermal layer expansion in at least one tilted or latent tilted smectic mesophase and a liquid crystal composition having a net positive thermal layer expansion in at least one tilted or latent tilted smectic mesophase, each of said compositions comprising at least one liquid crystal compound selected from the group consisting of smectic liquid crystal compounds and latent smectic liquid crystal compounds, wherein said composition having a net negative thermal layer expansion is present in an amount such that said mixture has an essentially temperature-independent layer spacing in at least one tilted smectic mesophase.

36. The device of claim 35 wherein said composition having a net negative thermal layer expansion comprises at least one chiral or achiral liquid crystal compound having at least one fluorinated terminal portion.

37. The device of claim 35 wherein said smectic mesophase is the smectic C mesophase.

* * * * *